(12) United States Patent
Muff et al.

(10) Patent No.: US 9,170,954 B2
(45) Date of Patent: Oct. 27, 2015

(54) TRANSLATION MANAGEMENT INSTRUCTIONS FOR UPDATING ADDRESS TRANSLATION DATA STRUCTURES IN REMOTE PROCESSING NODES

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/709,681

(22) Filed: Dec. 10, 2012

(65) Prior Publication Data
US 2014/0164732 A1 Jun. 12, 2014

(51) Int. Cl.
*G06F 12/10* (2006.01)
*G06F 12/08* (2006.01)

(52) U.S. Cl.
CPC ........ *G06F 12/1027* (2013.01); *G06F 12/0831* (2013.01); *G06F 12/1072* (2013.01); *G06F 12/109* (2013.01); *G06F 2212/301* (2013.01)

(58) Field of Classification Search
CPC .............. G06F 12/109; G06F 12/0831; G06F 12/1027; G06F 12/1072

USPC ......................................................... 711/141
See application file for complete search history.

(56) References Cited

U.S. PATENT DOCUMENTS

| | | | |
|---|---|---|---|
| 5,463,750 A * | 10/1995 | Sachs | ............................ 711/169 |
| 6,490,671 B1 | 12/2002 | Frank et al. | |
| 6,925,547 B2 | 8/2005 | Scott et al. | |
| 7,363,462 B2 | 4/2008 | Landin et al. | |
| 7,490,215 B2 | 2/2009 | Baxter et al. | |
| 7,590,817 B2 | 9/2009 | Moertl et al. | |
| 7,774,512 B2 | 8/2010 | Suzuoki | |
| 2001/0005873 A1 | 6/2001 | Yasuda et al. | |
| 2004/0215897 A1 | 10/2004 | Arimilli et al. | |
| 2008/0080491 A1 | 4/2008 | Saripalli | |

FOREIGN PATENT DOCUMENTS

| | | |
|---|---|---|
| CN | 101088077 A | 12/2007 |
| CN | 101099140 A | 1/2008 |
| CN | 101165666 A | 4/2008 |

* cited by examiner

*Primary Examiner* — Jae Yu
(74) *Attorney, Agent, or Firm* — Middleton Reutlinger

(57) ABSTRACT

Translation management instructions are used in a multi-node data processing system to facilitate remote management of address translation data structures distributed throughout such a system. Thus, in multi-node data processing systems where multiple processing nodes collectively handle a workload, the address translation data structures for such nodes may be collectively managed to minimize translation misses and the performance penalties typically associated therewith.

17 Claims, 10 Drawing Sheets

TRANSLATION MANAGEMENT INSTRUCTIONS FOR UPDATING ADDRESS TRANSLATION DATA STRUCTURES IN REMOTE PROCESSING NODES

FIELD OF THE INVENTION

The invention is generally related to data processing, and in particular to processor architectures and address translation data structures incorporated therein.

BACKGROUND OF THE INVENTION

Memory management, i.e., the operations that occur in managing the data stored in a computer, is often a key factor in overall system performance for a computer. Among other tasks, memory management oversees the retrieval and storage of data on a computer, as well as manages certain security tasks for a computer by imposing restrictions on what users and computer programs are permitted to access.

Modern computers typically rely on a memory management technique known as virtual memory management to increase performance and provide greater flexibility in computers and the underlying architectural designs upon which they are premised. With a virtual memory system, the underlying hardware implementing the memory system of a computer is effectively hidden from the software of the computer. A relatively large virtual memory space, e.g., 64-bits or more in width, is defined for such a computer, with computer programs that execute on the computer accessing the memory system using virtual addresses pointing to locations in the virtual memory space. The physical memory devices in the computer, however, are accessed via "real" addresses that map directly into specific memory locations in the physical memory devices. Hardware and/or software in the computer are provided to perform "address translation" to map the real memory addresses of the physical memory to virtual addresses in the virtual memory space. As such, whenever a computer program on a computer attempts to access memory using a virtual address, the computer automatically translates the virtual address into a corresponding real address so that the access can be made to the appropriate location in the appropriate physical device mapped to the virtual address.

One feature of virtual addressing it that is not necessary for a computer to include storage for the entire virtual memory space in the physical memory devices in the computer's main memory. Instead, lower levels of storage, such as disk drives and other mass storage devices, may be used as supplemental storage, with memory addresses grouped into "pages" that are swapped between the main memory and supplemental storage as needed. Due to the frequency of access requests in a computer, address translation can have a significant impact on overall system performance. As such, it is desirable to minimize the processing overhead associated with the critical timing path within which address translation is performed.

Address translation in a virtual memory system typically incorporates accessing various address translation data structures. One such structure, referred to as a page table, includes multiple entries that map virtual addresses to real addresses on a page-by-page basis. Often, due to the large number of memory accesses that constantly occur in a computer, the number of entries required to map all of the memory address space in use by a computer can be significant, and require the entries to be stored in main storage, rather than in dedicated memory, which makes accessing such entries prohibitively slow. To accelerate address translation with such a scheme, high speed memories referred to as translation lookaside buffers (TLB's) are typically used to cache recently-used entries for quick access by the computer. If a required entry is not stored in a TLB, a performance penalty is incurred in loading the entry from main storage; however, typically the hit rate on TLB's is sufficient that the penalty associated with loading entries from main storage is more than offset by the performance gains when entries are immediately accessible from the TLB. In still other designs, an additional level of caching may be used to further accelerate performance, by utilizing one or more effective to real address translation (ERAT) tables. Moreover, in some designs, separate data and instruction ERAT's are respectively provided in close proximity to the instruction and data processing logic in a processor to minimize the effects of address translation on the critical performance paths in the processor.

In addition, as semiconductor technology continues to inch closer to practical limitations in terms of increases in clock speed, architects are increasingly focusing on parallelism in processor architectures to obtain performance improvements. At the chip level, multiple processing cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

As a result, many data processing systems now incorporate multiple interconnected processing nodes that are coupled to one another over the same network, and often disposed on the same chips or integrated circuit devices. While in some designs the processing nodes may be identical to one another, in other designs the processing nodes may be heterogeneous, and include varying capabilities such that the overall system can handle various types of workloads. Some processing nodes, for example, may be general purpose processing nodes that are capable of running general purpose workloads, while other processing nodes may be more specialized, and specifically directed to assisting general purpose processing nodes in handling specific tasks. The specialized processing nodes, for example, may be accelerators or coprocessors, and may be used to handle a wide variety of tasks such as advanced arithmetic operations, encryption/decryption, compression/decompression, graphics, video or image processing, etc. In many cases, however, these specialized processing nodes are managed by a general purpose processing node to perform specific tasks upon request.

When multiple processing nodes are coupled to the same network, and in particular, share the same physical memory, dedicated address translation data structures may be provided in each of the processing nodes to cache translation entries and thereby accelerate memory accesses by those processing nodes. However, in many cases, workloads may be distributed across multiple processing nodes, so delays may be introduced as different processing nodes working on the same workload cache the same translation entries for any data stored in the shared memory.

As one example, where a general purpose processing node is coupled to a coprocessor, a program running on the general purpose processing node may store certain data in a region of memory for use by a coprocessor, then send a command to the coprocessor to perform operations on the data stored in that region of memory. When the general purpose processing node first attempts to store data in the memory region, a miss may initially occur in a dedicated ERAT or TLB for that node, thereby requiring an access to a page table to retrieve the translation entry for the memory region, which is often accompanied by a significant performance penalty. Then later, when the general purpose processing node sends the command to the coprocessor, and the coprocessor then attempts to retrieve the stored data, another miss will typically occur in the dedicated ERAT or TLB for the coprocessor, thereby requiring another access to the page table to retrieve the translation entry for the memory region. As such, two misses are incurred when the general purpose processing node and coprocessor attempt to access the same data.

Therefore, a significant need continues to exist in the art for a manner of better managing address translation data structures distributed throughout a multi-node data processing system.

SUMMARY OF THE INVENTION

The invention addresses these and other problems associated with the prior art by supporting one or more types of translation management instructions in a multi-node data processing system that facilitate remote management of address translation data structures distributed throughout the system. As such, for multi-node data processing systems where multiple processing nodes collectively handle a workload, the address translation data structures for such nodes may be collectively managed to minimize translation misses and the performance penalties typically associated therewith. In some embodiments, for example, one processing node may use translation management instructions to manage the address translation data structures of one or more other processing nodes such that the address translation data structures are optimally set up in advance to handle upcoming tasks to be performed by those other nodes.

One type of translation management instruction, for example, may be used to perform both local and remote operations on address translation data structures respectively disposed in local and remote processing nodes. For example, a search and push instruction may be used to search a local address translation data structure and return an index or other identifier for an entry matching a search criterion, as well as to additionally push data associated with the matching entry to a remote node so that the entry may be stored or otherwise generated in the address translation data structure for that remote node. As another example, a write and push instruction may be used to write data into an entry in a local address translation data structure, as well as to additional push the written data to a remote node so that a corresponding entry in the address translation data structure for that remote node may be similarly updated.

Another type of translation management instruction may be used to initiate a remote invalidation of an entry in the address translation data structure for a remote node, but without a corresponding invalidation of an entry in a local address translation data structure.

Therefore, consistent with one aspect of the invention, an instruction is processed in a data processing system of the type including a plurality of processing nodes, where each processing node among the plurality of processing nodes includes an address translation data structure, by decoding a translation management instruction in a first processing node among the plurality of processing nodes, where the translation management instruction is defined in an instruction set for the first processing node, and in response to decoding the translation management instruction in the first processing node, performing a first, local operation on the address translation data structure in the first processing node and initiating a second, remote operation on the address translation data structure in a second processing node among the plurality of processing nodes.

Consistent with another aspect of the invention, an instruction is processed in a data processing system of the type including a plurality of processing nodes, where each processing node among the plurality of processing nodes includes an address translation data structure, by decoding a translation management instruction in a first processing node among the plurality of processing nodes, where the translation management instruction is defined in an instruction set for the first processing node, and in response to decoding the translation management instruction in the first processing node, initiating an invalidation operation on the address translation data structure in a second processing node among the plurality of processing nodes to invalidate an entry in the address translation data structure in the second processing node without invalidating a corresponding entry in the address translation data structure in the first processing node.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Translation management instructions are provided in a multi-node data processing system to facilitate remote management of address translation data structures distributed throughout the system.

One type of translation management instruction, for example, may be used to perform both local and remote operations on address translation data structures respectively disposed in local and remote processing nodes. A search and push instruction may be used to search a local address translation data structure and return an index or other identifier for an entry matching a search criterion, as well as to additionally push data associated with the matching entry to a remote node so that the entry may be stored or otherwise generated in the address translation data structure for that remote node. A write and push instruction may be used to write data into an entry in a local address translation data structure, as well as to additional push the written data to a remote node so that a corresponding entry in the address translation data structure for that remote node may be similarly updated.

Another type of translation management instruction may be used to initiate a remote invalidation of an entry in the address translation data structure for a remote node, but without a corresponding invalidation of an entry in a local address translation data structure.

Local and remote processing nodes, in this regard, may include any processing logic disposed in a common coherence domain and coupled to one another via a shared network such as a shared bus. Examples of processing nodes include general purpose processing cores, coprocessors, accelerators, and other processing logic that utilizes address translation data when accessing a shared memory.

Other variations and modifications will be apparent to one of ordinary skill in the art. Therefore, the invention is not limited to the specific implementations discussed herein.

Hardware and Software Environment

Figure 1:
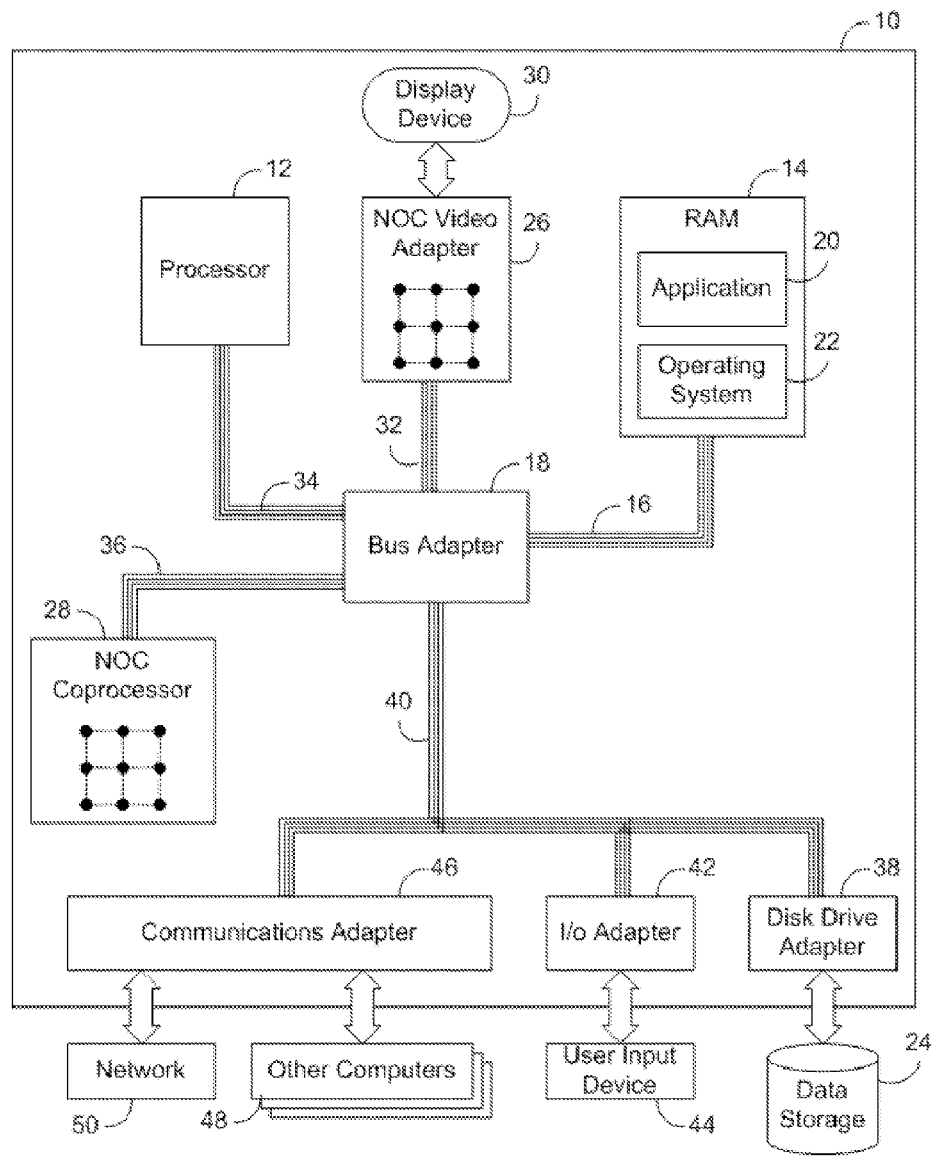
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
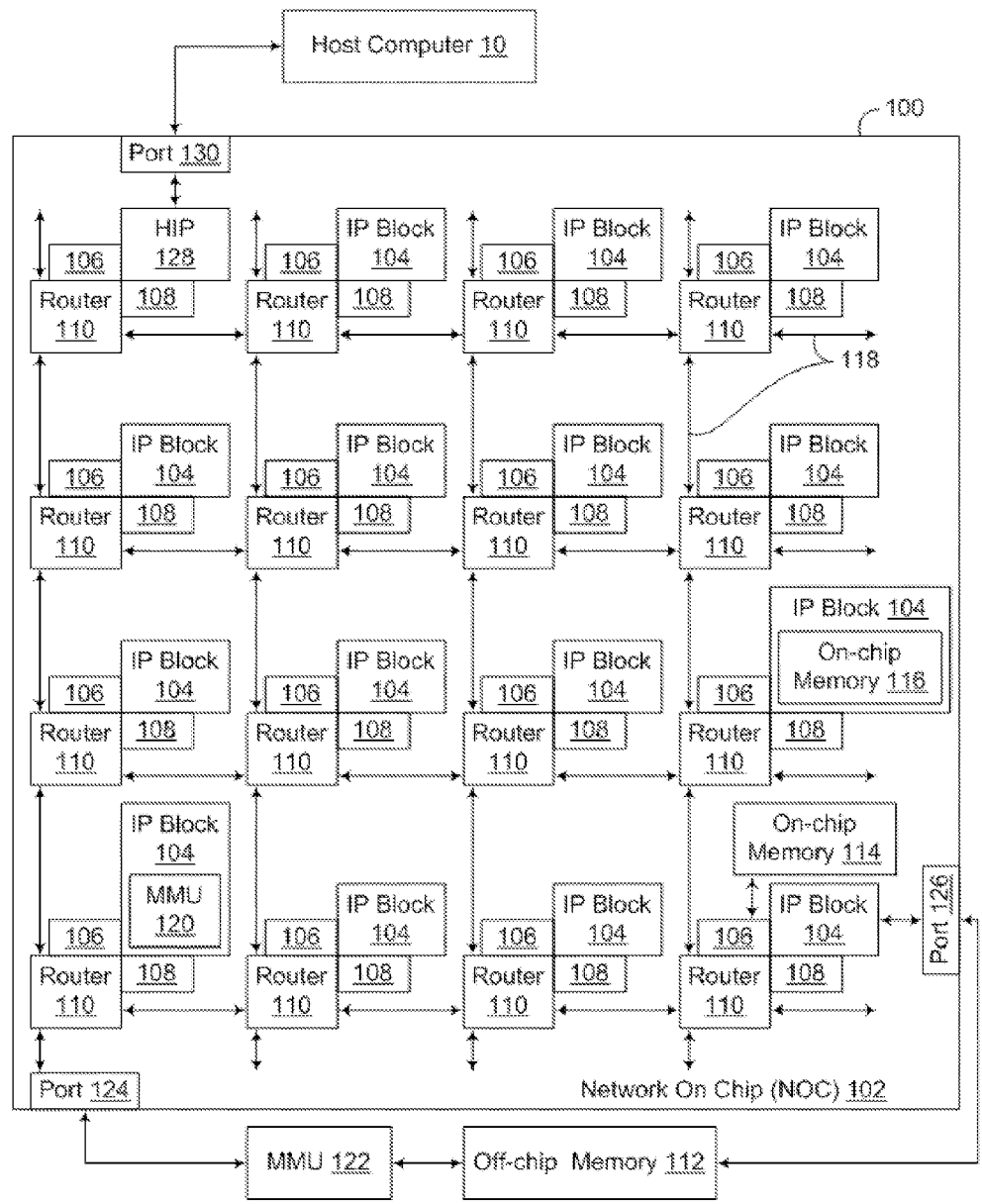
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC. NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
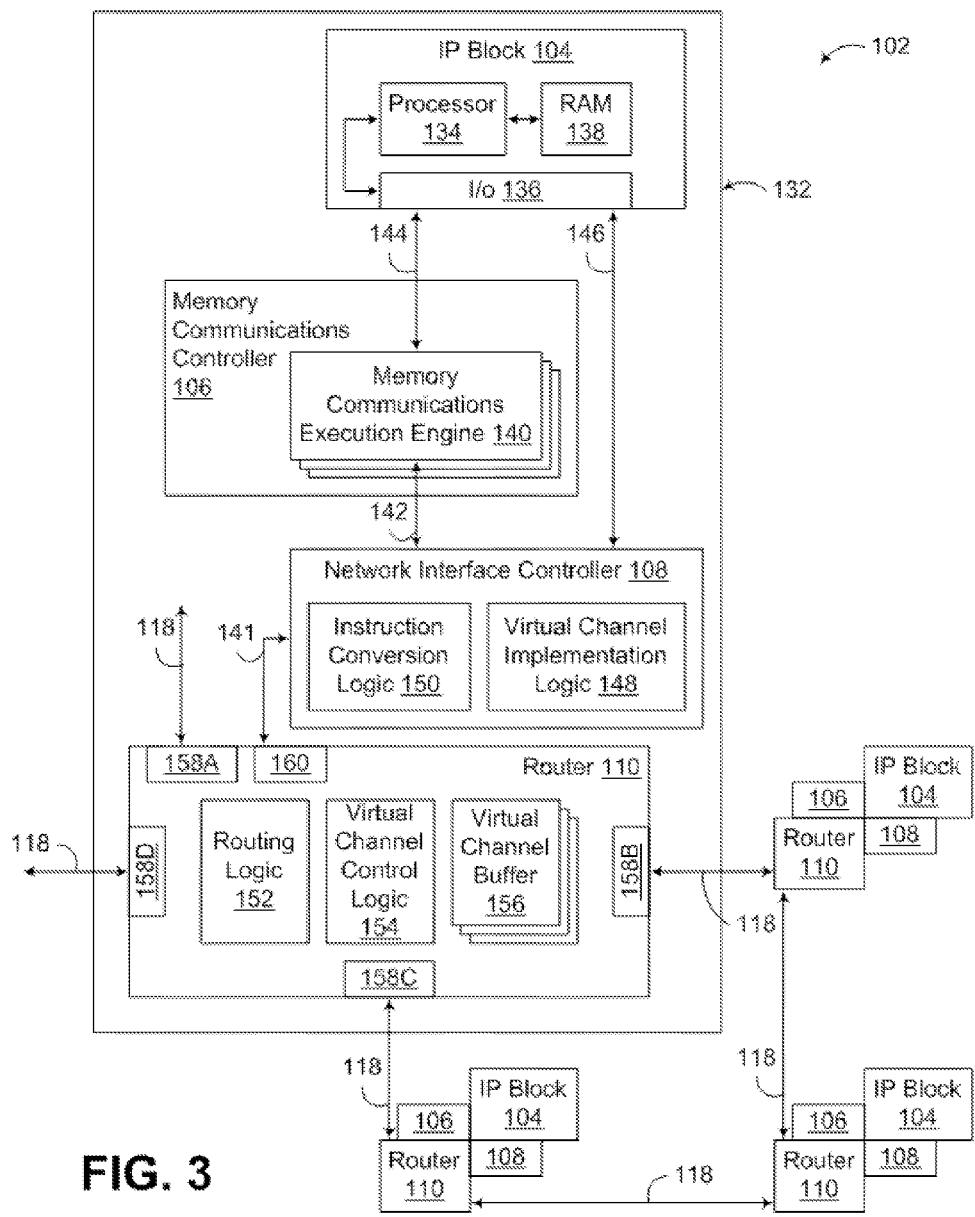
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block

104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
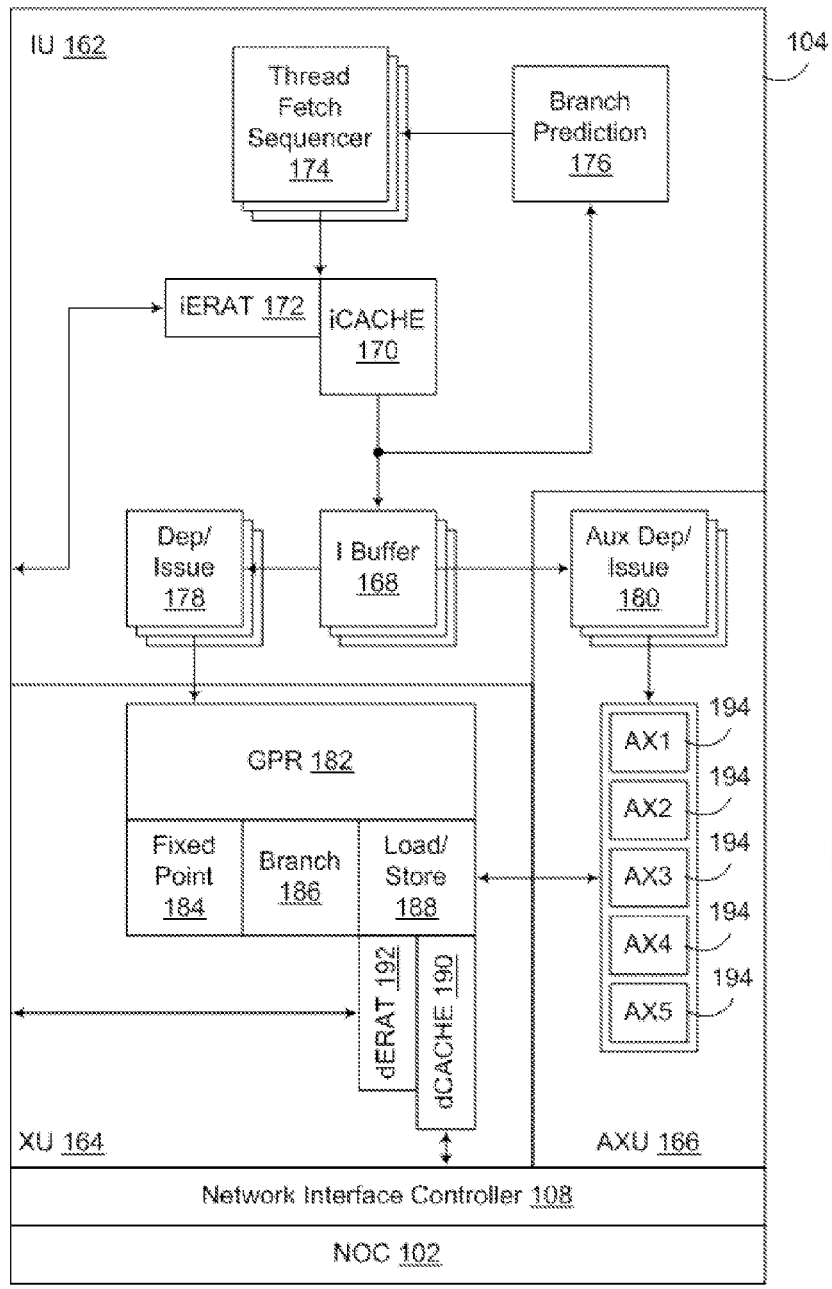
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Translation Management Instructions For Management of Remote Address Translation Data Structures Accelerators, coprocessors, central processing units (CPU's, and also referred to herein as general purpose processing nodes) and other types of processing nodes often require address translation data structures such as page tables, translation lookaside buffers (TLB's), and effective to real address translation tables (ERATs) in order to access shared memory in a functional and secure way. Because of this, many of these hardware components include hardware necessary to cache translation entries, and it is desirable in many situations to support software management of such address translation data structures, i.e., so that a hypervisor or other supervisory program on one processing node among a plurality of processing nodes can manage the address translation data structures on other nodes.

Embodiments consistent with the invention desirably reduce the amount of software overhead in managing accelerators, coprocessors, CPU's and other processing nodes by supporting one or more of translation management instructions suited for managing remote address translation data structures.

Figure 5:
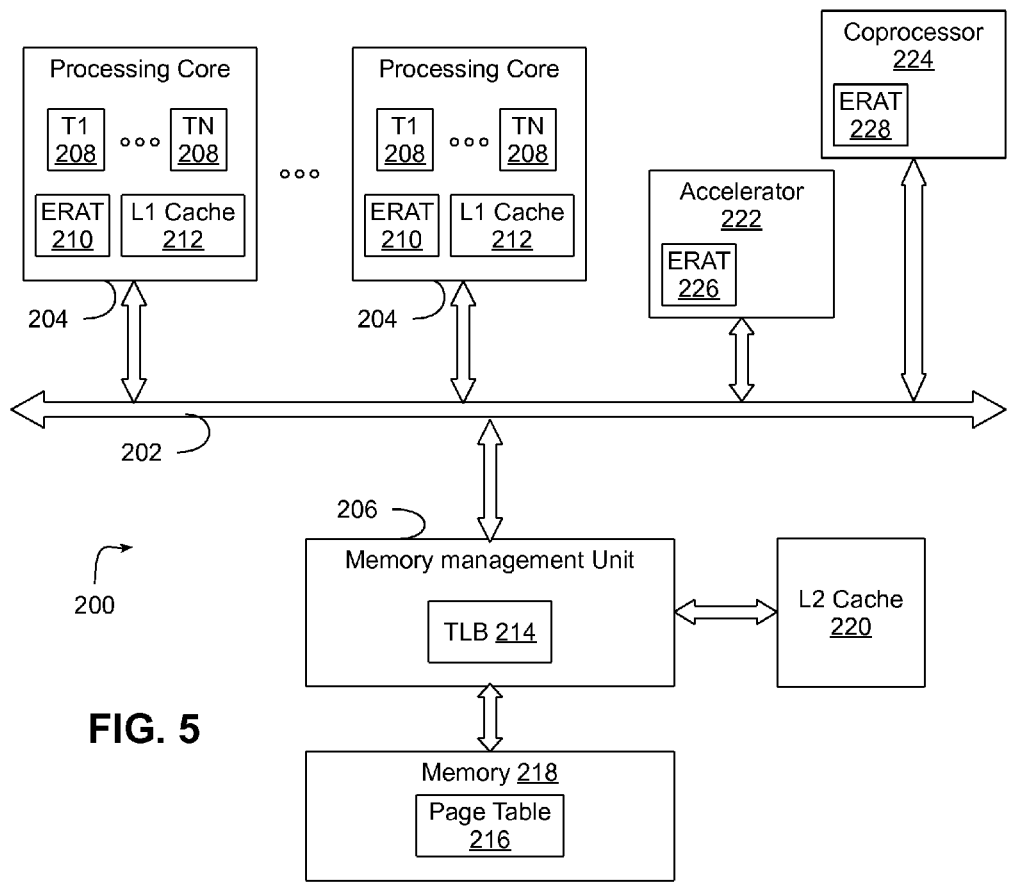
FIG. 5 is a block diagram illustrating an exemplary implementation of a multi-node data processing system suitable for implementing translation management instructions consistent with the invention.

FIG. 5, for example, illustrates an exemplary data processing system 200 suitable for implementing translation management instructions consistent with the invention. System 200 is illustrated with a memory bus 202 coupling together a plurality of processing cores 204 to a memory management unit (MMU) 206. While only two processing cores 204 are illustrated in FIG. 5, it will be appreciated that any number of processing cores may be utilized in different embodiments of the invention.

Each processing core 204 is an SMT core including a plurality (N) of hardware threads 208, along with an Effective To Real Translation (ERAT) table 210 and integrated L1 cache 212. ERAT 210, as is understood in the art, serves as a cache for memory address translation data, e.g., page table entries (PTE's), and is typically associated with a lower level data structure, e.g., a translation lookaside buffer (TLB) 214 disposed in or otherwise accessible to MMU 206. TLB 214 may also serve as a cache for a larger page table 216, which is typically stored in a memory 218.

The memory system may include multiple levels of memory and caches, and as such, data processing system 200 is illustrated including an L2 cache 220 coupled to MMU 206 and shared by processing cores 204.

In addition, to extend or enhance the performance of data processing system 200 for a specific application or type of workload, one or more accelerators 222 and/or coprocessors 224 may also be coupled to bus 202 and thus accessible for performing various processing tasks, e.g., advanced arithmetic operations, encryption/decryption, compression/decompression, graphics, video or image processing, etc. Within each such accelerator 222 and 224 may also be provided a dedicated ERAT 226, 228.

It will be appreciated, however, that various alternative processing and/or memory architectures may be utilized in other embodiments of the invention. For example, additional levels of cache memory, e.g., L3 caches, may be used, and memory 218 may be partitioned in some embodiments, e.g., in Non-Uniform Memory Access (NUMA)-based data processing systems. Furthermore, additional cache levels may be dedicated to particular processing cores, e.g., so that each processing core includes a dedicated L2 cache, which may be integrated into the processing core or coupled between the processing core and the memory bus. In some embodiments, an L2 or L3 cache may be coupled directly to the memory bus, rather than via a dedicated interface to an MMU.

Figure 6:
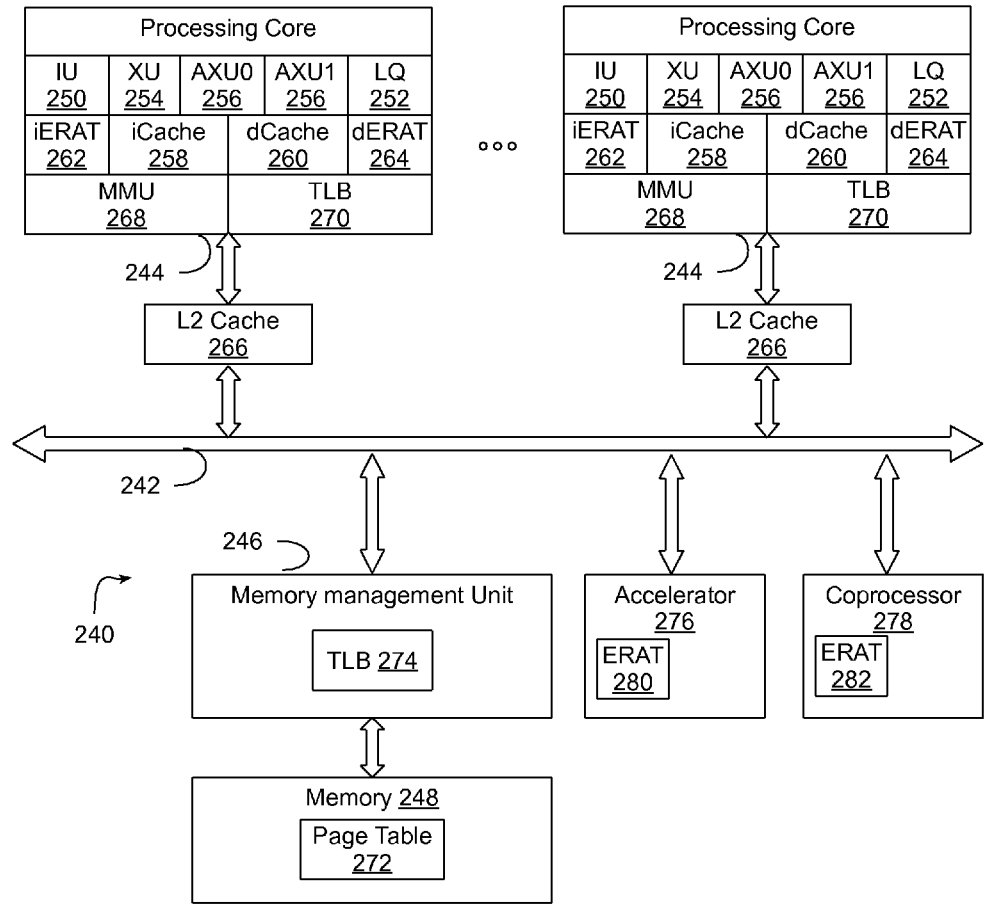
FIG. 6 is a block diagram illustrating an alternate implementation of a multi-node data processing system to that of FIG. 5.

For example, FIG. 6 illustrates an alternate implementation of a data processing system 240 including a memory bus or other shared network 242 coupled to a plurality of processing cores to a memory management unit 246 supporting a main memory 248. Each processing core 244 includes a number of functional units, such as an instruction unit (IU) 250, a load store unit (LQ) 252, one or more fixed point execution units (XU's) 254 and one or more auxiliary execution units (AXU's) 256 capable of fetching, decoding, issuing and executing instructions from one or more instruction streams. Different numbers and combinations of XU's and AXU's may be used in different designs to support different types of workloads, and AXU's may be implemented, for example, as scalar or vector units, floating point execution units, or various accelerators or engines.

Each processing core 244 further includes an L1 cache implemented using separate instruction (iCache) and data (dCache) caches 258, 260, each with an associated ERAT, iERAT 262 for iCache 258 and dERAT 264 for dCache 260. In addition, each processing core 244 is coupled to system bus 242 through an associated L2 cache 266, and includes an MMU 268 and TLB 270 associated therewith.

Each iERAT 262, dERAT 264 and TLB 270 caches entries from a page table 272 in system memory 248. In addition, MMU 246 additionally includes a TLB 274 for caching entries on behalf of one or more accelerators 276 and/or coprocessors 278, and each accelerator 276 and coprocessor 278 includes a dedicated ERAT 280, 282.

It will be appreciated that the components illustrated in FIGS. 5 and 6 may be integrated onto the same integrated circuit device, or chip, or may be disposed in multiple such chips. In one embodiment, for example, each processing core is implemented as an IP block in a NOC arrangement, and the associated system bus, accelerators, coprocessors, caches, MMU's and/or memories are integrated onto the same chip as the processing cores in a SOC arrangement. In other embodiments, one or more of these components in different chips from the processing cores, and in some instances processing cores may be disposed on separate chips.

In each of these embodiments, the processing cores, accelerators, coprocessors, and any other component including a dedicated ERAT, TLB or other address translation data structure may be considered to be a processing node. Moreover, each system bus may be considered to be a shared network that enables the processing nodes coupled to the shared network to communicate with one another. It will be appreciated that other shared network implementations may be used in the alternative, including, for example, multi-drop buses, switched networks, packet-based networks, etc. In general, given the wide variety of known processor and memory architectures with which the invention may be utilized, it will be appreciated that the invention is not limited to the particular hardware components and other architecture implementations illustrated herein.

It is within embodiments such as shown in FIGS. 5 and 6 that translation management instructions may be implemented to enable software running on one processing node, e.g., a CPU or general purpose processing node to remotely manage the address translation data structures in other nodes coupled to the same shared network. By doing so, a supervisory program such as a hypervisor is better able to manage remote nodes, and in particular the address translation data structures in such nodes, to maximize memory access performance by those remote nodes when accessing shared memory.

In one embodiment of the invention, for example, at least a portion of the processing nodes may be implemented as A2-compatible processing cores available from International Business Machines, and compatible with the Power Instruction Set Architecture (ISA). The A2 core instruction set supports a number of memory management-related instructions. For example, for TLB management, the following instructions are supported: TLB read instructions (tlbre), TLB write instructions (tlbwe), TLB search instructions (tlbsx), TLB search and reserve instructions (tlbsrx), TLB invalidate virtual address instructions (tlbivax), TLB invalidate local instructions (tlbilx) and TLB sync instructions (tlbsync). Corresponding instructions also exist for ERAT management, including eratre, eratwe, eratsx, erativax, and eratilx.

A common characteristic of these instructions is that, with the exception of the TLB and ERAT invalidate virtual address instructions (tlbivax and erativax), the instructions are used to perform local management of an address translation data structure in the same node that is executing the instruction. For the tlbivax and erativax instructions, the instructions act globally, and invalidate an entry wherever it is cached in any address translation data structure, in both local and remote processing nodes alike.

Embodiments consistent with the invention, however, provide added functionality beyond that provided by the A2 instruction set, by supporting additional translation management instructions that initiate two different but complementary operations on local and remote nodes, as well as additional instructions that initiate operations on remote nodes without performing complementary operations on local nodes. As will become more apparent below, such additional functionality may be useful to enable a hypervisor or other supervisory program running on one processing node to "set up" the address translation data structures for accelerators, coprocessors or even other general purpose processing nodes such that when those nodes are issued tasks to perform, the likelihood of translation misses occurring will be minimized, and thus latencies associated with performing those issued tasks will be minimized.

The first type of instructions are used to perform a first, local operation on the address translation data structure in a local processing node and initiate a second, remote operation on the address translation data structure of at least one remote processing node. For example, a search and push instruction may be used by a hypervisor to search an address translation data structure on a local node, and, if a match is found, forward the value to one or more remote nodes, e.g., to an accelerator or another processing node. Such an instruction thus enables one node to pre-enable and set up the accelerator or other processing node to access locations controlled by the local hypervisor.

Figure 7:
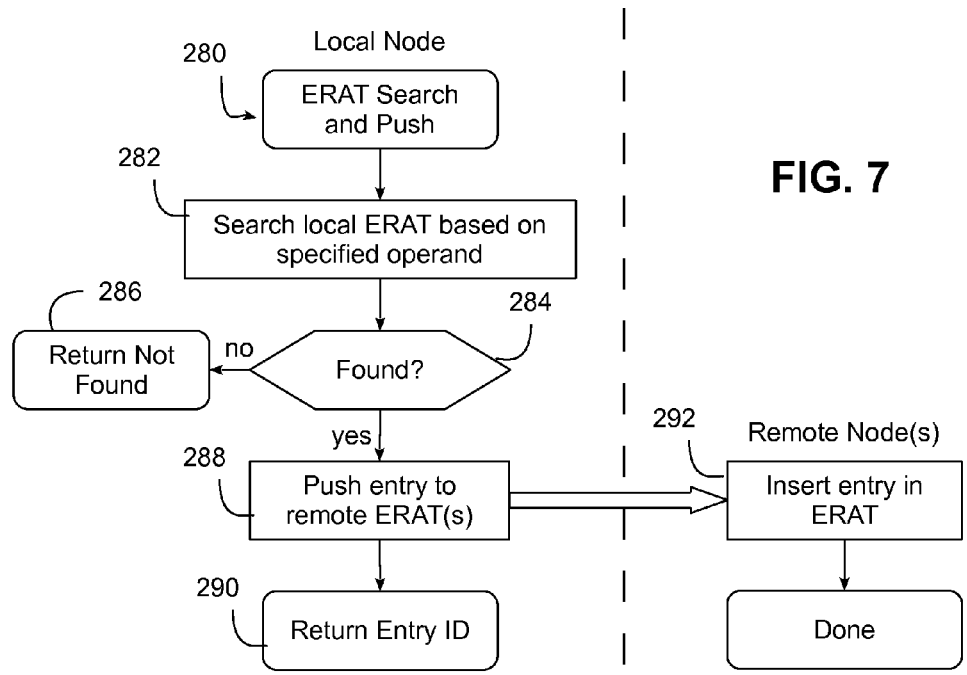
FIG. 7 is a flowchart illustrating an example sequence of operations performed when executing an ERAT search and push instruction in a processing node in either of the data processing systems of FIGS. 5 and 6.

As shown in FIG. 7, for example, an ERAT search and push instruction 280 may be used to search an ERAT in a local node based on a specified search criterion, such as specified by an operand to the instruction (block 282). As shown in block 284, if no entry is found matching the search criterion, a "not found" status may be returned in response to the instruction (block 286). Otherwise, if found, the identified entry may be pushed to one or more remote ERAT's (block 288), with an identifier for the matching entry returned to the local node (block 290) as the response to the instruction. In addition, as illustrated in block 292, when the pushed entry is received by a remote node, the node may insert the entry in that node's associated ERAT.

An entry may be pushed to a remote ERAT in a number of manners consistent with the invention. For example, the entry may be pushed via a command on a system bus, e.g., using a command type allocated to push instructions, which would be snooped by any processing node having an ERAT. In addition, in some embodiments, it may be desirable to support one or both of targeted and broadcast push instructions. A targeted push instruction, for example, may identify one or more specific processing nodes such that an entry will be pushed only to specific processing nodes requested by the local node, e.g., using a targeted command on the system bus. A broadcast push instruction, on the other hand, may be used to push the entry to all remote processing nodes, such that all such nodes store the entry in their respective ERAT's, e.g., using a broadcast command on the system bus.

An ERAT search and push instruction may be implemented, for example, in a similar manner to an ERAT search indexed instruction in the Power ISA. The latter includes three operands, RA, RB and RT. RA and RB are used to specify an effective address (EA) to search for in the local ERAT, while RT is used to return the index of a first matching entry for that effective address, and the same instruction format may be used for an ERAT search and push instruction consistent with the invention. In various embodiments, special purpose registers may be used to select various configurable options, e.g., broadcast or targeted, and a mask or other identifier used to target one or more specific remote processing nodes, or some or all of such information may be encoded into the instruction. For example, in one embodiment, a mask or target may be specified in the RT operand to specify to which remote nodes the instruction is targeted.

Figure 8:
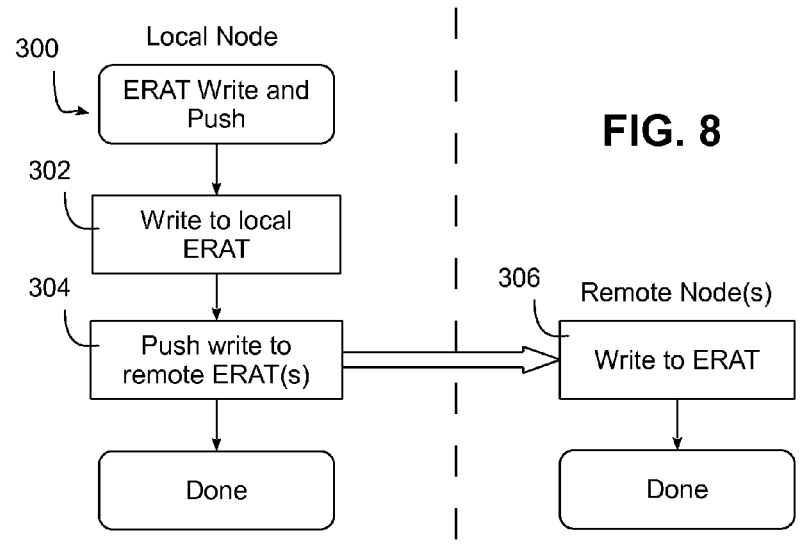
FIG. 8 is a flowchart illustrating an example sequence of operations performed when executing an ERAT write and push instruction in a processing node in either of the data processing systems of FIGS. 5 and 6.

As another example of the first type of instruction, a write and push instruction may be used to write to an address translation data structure and forward the value to an accelerator or another processing node. Such an instruction thus also enables pre-enables and sets up the accelerator or other processing node to access locations controlled by the local hypervisor. As shown in FIG. 8, for example, an ERAT write and push instruction 300 may be used to write data into an ERAT entry in a local node, such as specified by an operand to the instruction (block 302). Then, the write data is pushed to one or more remote ERAT's (block 304), and as illustrated in block 306, when the pushed data is received by a remote node, the node may perform a similar write to that node's associated ERAT.

An ERAT write and push instruction may be implemented, for example, in a similar manner to an ERAT write instruction in the Power ISA. The latter includes three operands, RS, RA and WS. RS specifies the data to be written into an entry, while RA specifies the entry to be written and WS specifies which of two portions of the entry are to be written. In various embodiments, special purpose registers may be used to select various configurable options, e.g., broadcast or targeted, and a mask or other identifier used to target one or more specific remote processing nodes, or some or all of such information may be encoded into the instruction. For example, in one embodiment, a mask or target may be specified in a portion of the RA operand to specify to which remote nodes the instruction is targeted.

As to the second type of translation management instruction, a remote invalidate instruction may be used to delete or invalidate selected entries in one or more address translation data structures in one or more remote nodes, without also deleting or invalidating the corresponding entries in the address translation data structure in the local node. Specifically, a remote invalidate instruction may be used to initiate an invalidation operation on the address translation data structure in a remote processing node to invalidate an entry in the address translation data structure in the remote processing node without invalidating a corresponding entry in the address translation data structure in the local node.

Figure 9:
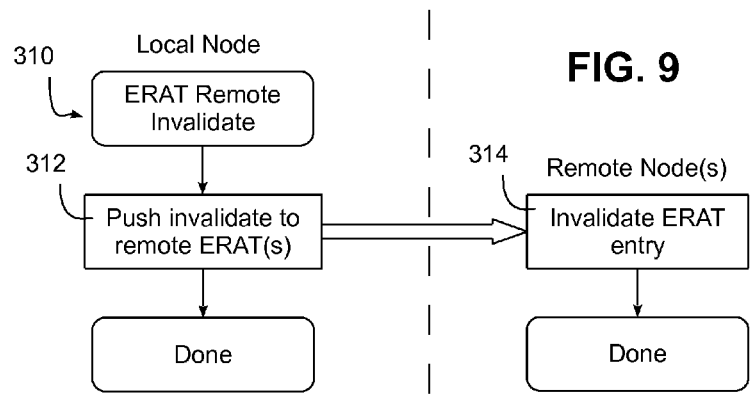
FIG. 9 is a flowchart illustrating an example sequence of operations performed when executing an ERAT remote invalidate instruction in a processing node in either of the data processing systems of FIGS. 5 and 6.

As shown in FIG. 9, for example, an ERAT remote invalidate instruction 310 may push an invalidate operation to one or more remote ERAT's (block 312), and as illustrated in block 314, when the pushed invalidate operation is received by a remote node, the node may invalidate the specified entry in the ERAT in that remote node.

An ERAT remote invalidate instruction may be implemented, for example, in a similar manner to an ERAT Invalidate virtual address indexed instruction in the Power ISA. The latter includes three operands, RS, RA and RB. RS specifies a page size, while RA and RB collectively specifies an effective address (EA). In various embodiments, special purpose registers may be used to select various configurable options, e.g., broadcast or targeted, and a mask or other identifier used to target one or more specific remote processing nodes, or some or all of such information may be encoded into the instruction. For example, in one embodiment, a mask or target may be specified in a portion of the RS operand to specify to which remote nodes the instruction is targeted. Unlike an ERAT invalidate virtual address indexed instruction, however, the corresponding entry in the ERAT on the local node is not invalidated, which in many embodiments allows a local hypervisor to control remote ERAT entries with greater precision.

Figure 10:
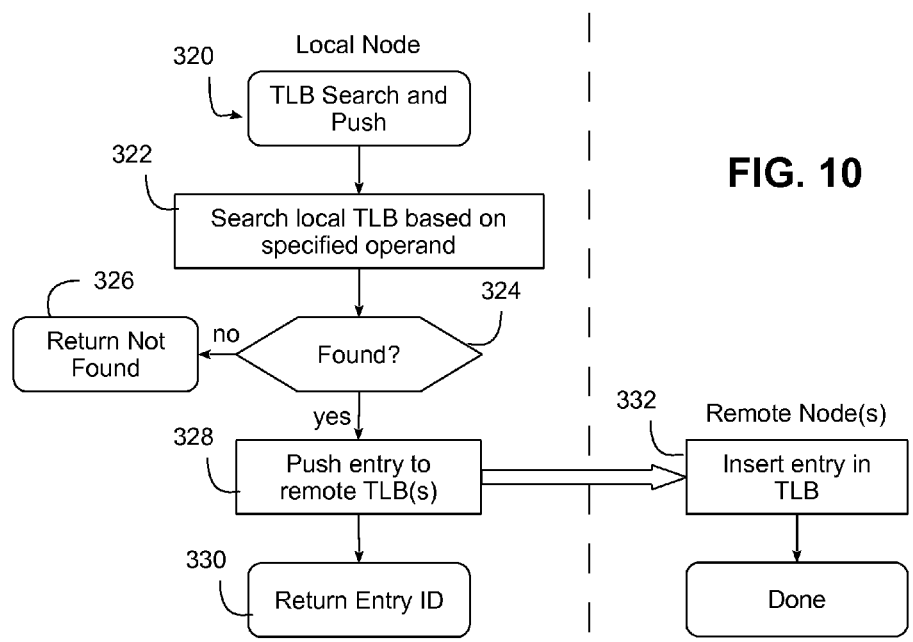
FIG. 10 is a flowchart illustrating an example sequence of operations performed when executing a TLB search and push instruction in a processing node in either of the data processing systems of FIGS. 5 and 6.

In some embodiments of the invention, TLB-specific instructions may be used in lieu of or in addition to ERAT-specific instructions. FIG. 10, for example, illustrates a TLB search and push instruction 320 that may be used to search a TLB in a local node based on a specified search criterion, such as specified by an operand to the instruction (block 322). As shown in block 324, if no entry is found matching the search criterion, a "not found" status may be returned in response to the instruction (block 326). Otherwise, if found, the identified entry may be pushed to one or more remote TLB's (block 328), with an identifier for the matching entry returned to the local node (block 330) as the response to the instruction. In addition, as illustrated in block 332, when the pushed entry is received by a remote node, the node may insert the entry in that node's associated TLB.

Figure 11:
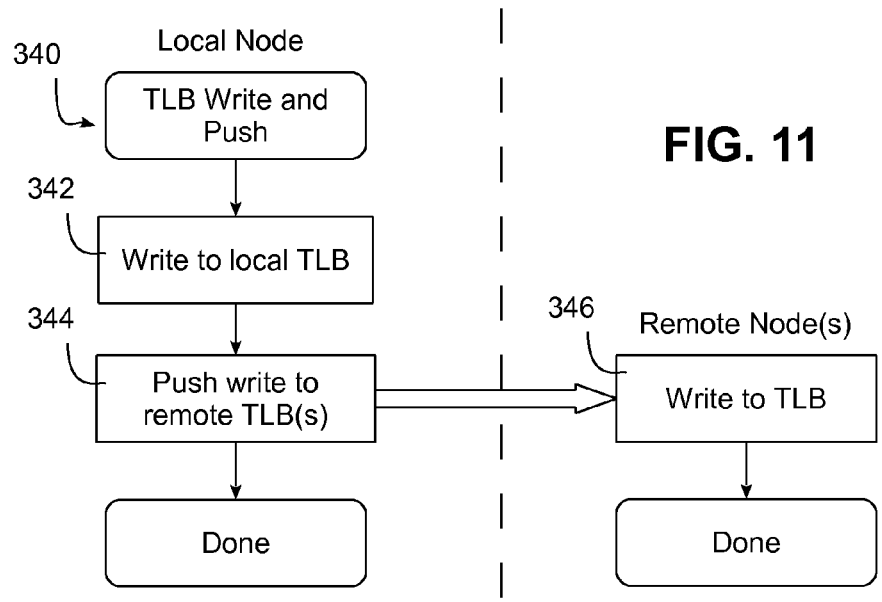
FIG. 11 is a flowchart illustrating an example sequence of operations performed when executing a TLB write and push instruction in a processing node in either of the data processing systems of FIGS. 5 and 6.

In addition, as shown in FIG. 11, for example, a TLB write and push instruction 340 may be used to write data into a TLB entry in a local node, such as specified by an operand to the instruction (block 342). Then, the write data is pushed to one or more remote TLB's (block 344), and as illustrated in block 346, when the pushed data is received by a remote node, the node may perform a similar write to that node's associated TLB.

Figure 12:
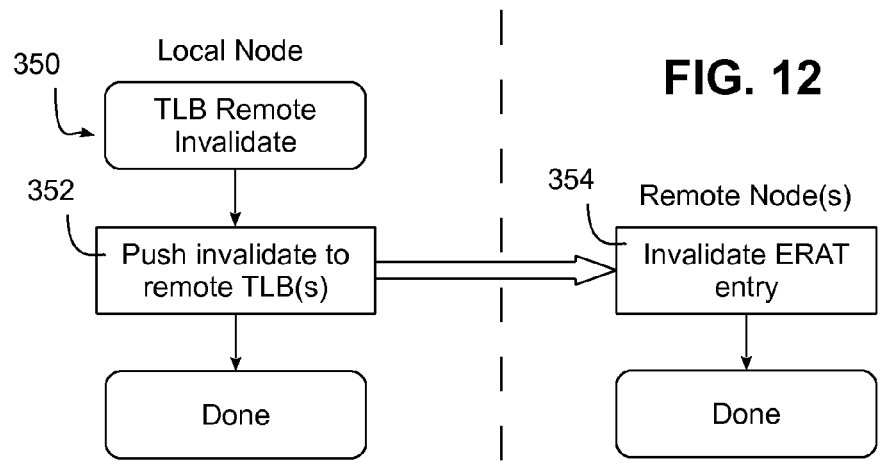
FIG. 12 is a flowchart illustrating an example sequence of operations performed when executing a TLB remote invalidate instruction in a processing node in either of the data processing systems of FIGS. 5 and 6.

Furthermore, as shown in FIG. 12, for example, a TLB remote invalidate instruction 350 may push an invalidate operation to one or more remote TLB's (block 315), and as illustrated in block 354, when the pushed invalidate operation is received by a remote node, the node may invalidate the specified entry in the TLB in that remote node.

Each of the TLB search and push, write and push, and remote invalidate instructions may be implemented similarly to instructions in the Power ISA, and configured in a similar manner to the ERAT-specific instructions discussed above, e.g., with the TLB search and push instruction implemented similarly to a tlbsx instruction, the TLB write and push instruction implemented similarly to a tlbwe instruction, and the TLB remote invalidate instruction implemented similarly to a tlbivax instruction.

In addition, in some embodiments consistent with the invention, the aforementioned translation management instructions may implement additional functionality, e.g., by combining or piggy-backing the instructions onto other instructions in an instruction set. For example, in one embodiment, search and push and write and push instructions may be paired with or piggy-backed on a coprocessor initiation instruction, such as the icswx instruction in the Power ISA. In such an embodiment, the desired translation information may be communicated along with an initiation or kick-off command for a coprocessor or accelerator (which are collectively referred to as a coprocessor for the purposes of this embodiment).

Figure 13:
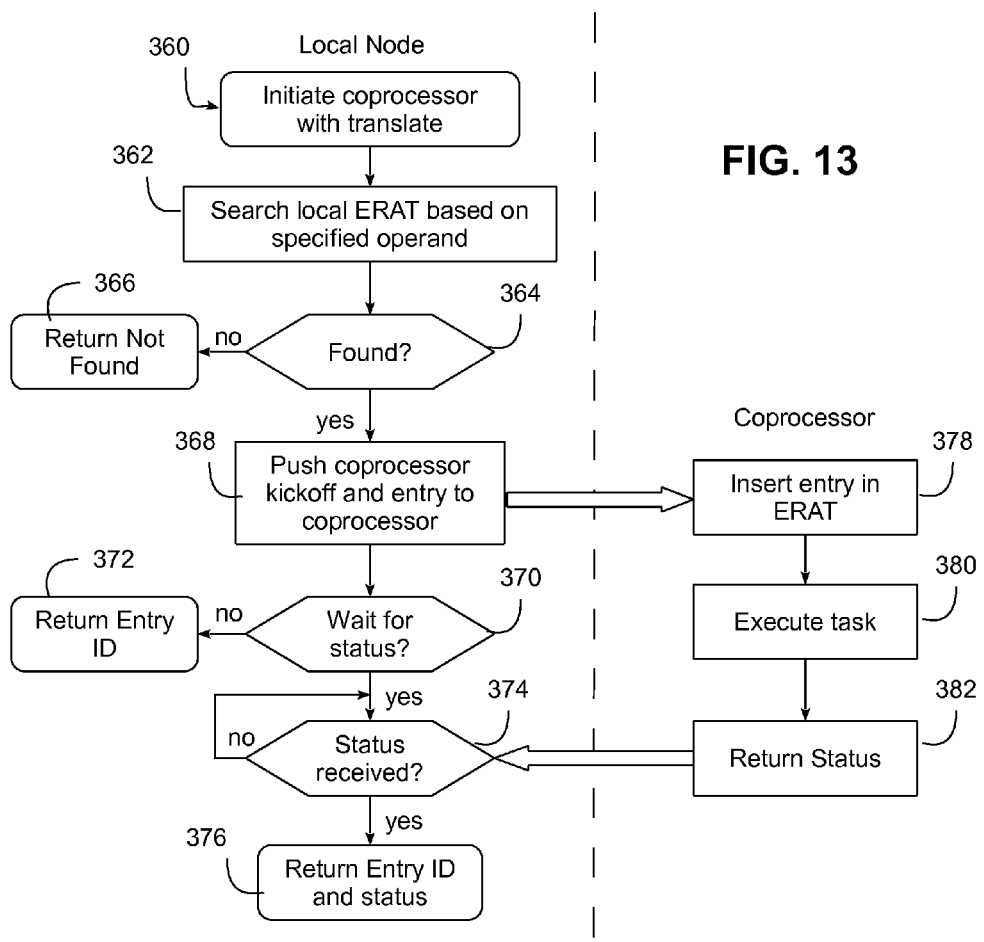
FIG. 13 is a flowchart illustrating an example sequence of operations performed when executing an initiate coprocessor with translate instruction in a processing node in either of the data processing systems of FIGS. 5 and 6.

FIG. 13, for example, illustrates an initiate coprocessor with translate instruction 360 that may be implemented, for example, in a similar manner to a Power ISA icswx instruction. The instruction may be executed, for example, after a control block is set up for the coprocessor, such that the execution of the initiate instruction causes the coprocessor to perform a task using the data in the control block (as well as in various control registers). Such an instruction may be useful, for example, if a coprocessor only needs one page of memory, such that the translation entry for that one page can be sent along with the kickoff command.

When executing the initiate coprocessor with translate instruction an ERAT (or TLB) is searched in a local node based on a specified search criterion, such as specified by an operand to the instruction (block 362). As shown in block 364, if no entry is found matching the search criterion, a "not found" status may be returned in response to the instruction (block 366). Otherwise, if found, the identified entry may be pushed to the coprocessor along with a kickoff command or bit (block 368). Next, depending on whether the instruction specifies that the node should wait until a status is returned from the coprocessor (block 370), the instruction either returns an identifier for the matching entry and immediately completes (block 372), or waits for a status to be returned from the coprocessor (block 374). Once a status is received, the matching entry identifier and the status are returned in block 376.

From the perspective of the coprocessor, when the entry and kickoff are received from the initiating node, the coprocessor inserts the pushed entry into its associated ERAT (or TLB) 378, and executes the task specified by the control block (block 380). The status of the task execution is then returned in block 382.

In addition, in some embodiments, an initiate coprocessor with translate instruction may be used in connection with coprocessors or accelerators that lack a dedicated address translation data structure. Thus, if a particular coprocessor or accelerator only needs one page of memory, the instruction may be used to then send the translation entry for that one page with the work kickoff so the coprocessor or accelerator does not need a dedicated ERAT or MMU.

It will be appreciated that each of the aforementioned instructions is defined in an instruction set for the local processing node such that, when each of the instructions is received from an instruction stream being executed by the local processing node, the issue unit in the local processing node will decode the instruction and then perform the operations discussed above. It will be appreciated that implementation of such instructions within a processing node, and specifically within decode logic in an issue unit to decode such instructions, within address translation logic to perform the associated operations, and within interface logic to both push commands over a shared network and snoop commands sent by other nodes, would be well within the abilities of one of ordinary skill in the art having the benefit of the instant disclosure.

Therefore, embodiments consistent with the invention may be used to reduce the amount of software overhead in managing accelerators, coprocessors, and other remote processing nodes in a multi-node data processing system. Various additional modifications may be made to the disclosed embodiments without departing from the spirit and scope of the invention. Therefore, the invention lies in the claims hereinafter appended.

What is claimed is:

1. A method of processing an instruction in a data processing system, wherein the data processing system includes a plurality of processing nodes, and wherein each processing node among the plurality of processing nodes includes an address translation data structure, the method comprising:
    decoding a translation management instruction in a first processing node among the plurality of processing nodes, wherein the translation management instruction is defined in an instruction set for the first processing node to enable software running on the first processing node to remotely manage the address translation data structure in at least one other processing node among the plurality of processing nodes; and
    in response to decoding the translation management instruction in the first processing node, performing a first, local operation on the address translation data structure in the first processing node and initiating a second, remote operation on the address translation data structure in a second processing node among the plurality of processing nodes, wherein each of the first and second processing nodes is a general purpose processing node, a coprocessor or an accelerator.

2. The method of claim 1, wherein the translation management instruction comprises a search and push instruction, wherein performing the first operation comprises searching for an entry in the address translation data structure in the first processing node, and wherein initiating the second operation comprises pushing at least a portion of the entry to the second processing node to update the address translation data structure in the second processing node.

3. The method of claim 2, wherein pushing the portion of the entry to the second processing node is only performed if the entry is found.

4. The method of claim 1, wherein the translation management instruction comprises a write and push instruction, wherein performing the first operation comprises writing data to an entry in the address translation data structure in the first processing node, and wherein initiating the second operation comprises pushing at least a portion of the data to the second processing node to update the address translation data structure in the second processing node.

5. The method of claim 1, wherein initiating the second operation includes communicating a broadcast command over a shared network to which each of the plurality of processing nodes is coupled such that each processing node among the plurality of processing nodes other than the first processing node performs the second operation in response to the broadcast command.

6. The method of claim 1, wherein the translation management instruction targets the second processing node, and wherein initiating the second operation includes communicating a command to the second processing node over a shared network to which each of the plurality of processing nodes is coupled.

7. The method of claim 1, wherein the address translation data structure in each processing node comprises an effective to real translation (ERAT) table.

8. The method of claim 1, wherein the address translation data structure in each processing node comprises a translation lookaside buffer (TLB).

9. The method of claim 1, wherein the second processing node comprises a general purpose processing node.

10. The method of claim 1, wherein the second processing node is selected from the group consisting of an accelerator and a coprocessor.

11. The method of claim 10, wherein the translation management instruction comprises a coprocessor initiate instruction, and wherein the second operation is further configured to initiate a coprocessor task on the coprocessor.

12. A circuit arrangement, comprising:
    a plurality of processing nodes coupled to one another over a shared network; and
    a plurality of address translation data structures respectively disposed in the plurality of processing nodes;
    wherein a first processing node among the plurality of processing nodes is configured to decode a translation management instruction defined in an instruction set for the first processing node to enable software running on the first processing node to remotely manage the address translation data structure in at least one other processing node among the plurality of processing nodes, and in response to decoding the translation management instruction, perform a first, local operation on the address translation data structure in the first processing node and initiate a second, remote operation on the address translation data structure in a second processing node among the plurality of processing nodes, wherein each of the first and second processing nodes is a general purpose processing node, a coprocessor or an accelerator.

13. The circuit arrangement of claim 12, wherein the translation management instruction comprises a search and push instruction, wherein the first processing node is configured to perform the first operation by searching for an entry in the address translation data structure in the first processing node, and to initiate the second operation by pushing at least a portion of the entry to the second processing node to update the address translation data structure in the second processing node.

14. The circuit arrangement of claim 12, wherein the translation management instruction comprises a write and push instruction, wherein the first processing node is configured to perform the first operation by writing data to an entry in the address translation data structure in the first processing node, and to initiate the second operation by pushing at least a portion of the data to the second processing node to update the address translation data structure in the second processing node.

15. The circuit arrangement of claim 14, wherein the second processing node comprises a coprocessor, wherein the translation management instruction comprises a coprocessor initiate instruction, and wherein the second operation is further configured to initiate a coprocessor task on the coprocessor.

16. An integrated circuit device including the circuit arrangement of claim 12.

17. A program product comprising a non-transitory computer readable storage medium and logic definition program code resident on the computer readable storage medium and defining the circuit arrangement of claim 12.

* * * * *